United States Patent [19]

Petersen

[11] Patent Number: 5,367,814
[45] Date of Patent: Nov. 29, 1994

[54] APPARATUS FOR BAITING A FISHING LINE

[76] Inventor: Steven H. Petersen, 16092 Nelson St., Westminster, Calif. 92683

[21] Appl. No.: 32,802

[22] Filed: Mar. 17, 1993

[51] Int. Cl.⁵ ............................................. A01K 97/00
[52] U.S. Cl. ......................................................... 43/4
[58] Field of Search ................................................ 43/4

[56] References Cited

U.S. PATENT DOCUMENTS

| | | | |
|---|---|---|---|
| 3,193,962 | 7/1965 | Simpson | 43/4 |
| 4,073,083 | 2/1978 | Davis | 43/4 |
| 4,559,734 | 12/1985 | Sauer et al. | 43/4 |
| 4,674,220 | 6/1987 | Bearce, Jr. et al. | 43/4 |
| 4,706,403 | 11/1987 | Reynolds | 43/4 |
| 4,709,498 | 12/1987 | Wolski | 43/4 |
| 4,848,019 | 7/1989 | Toogood | 43/4 |
| 4,915,631 | 4/1990 | Robinson et al. | 43/4 |
| 5,016,383 | 5/1991 | Rizzetto | 43/4 |
| 5,125,180 | 6/1992 | Dean | 43/4 |
| 5,155,930 | 10/1992 | Monarez | 43/4 |

FOREIGN PATENT DOCUMENTS 2530285  1/1977  Germany ................................ 43/4

*Primary Examiner*—Kurt Rowan
*Attorney, Agent, or Firm*—Macro Search Inc.

[57] ABSTRACT

An apparatus and method of its use is provided for baiting a fishing line. A handle has a hole therethrough and a surface for gripping the handle. An elongate tube has a proximal end and a distal end and is fixedly engaged with the hole of the handle at the proximal end. The distal end of the tube has a terminal edge which may include a sharp edge for cutting through a bait. In use, a free end of the fishing line is threaded first through the tube, from the distal end to the proximal end, and then through the handle. The free end of the fishing line is then secured to the handle. A looped portion of the fishing line is then extended from the distal end of the tube and along the tube. The tube is then forced through the bait such that the distal end of the tube extends clear of the bait. The free end of the fishing line is then drawn out of both the tube and the handle. The tube is then withdrawn from the bait, leaving the fishing line within the bait with the free end of the fishing line available for affixing a fishing device to the free end.

5 Claims, 2 Drawing Sheets

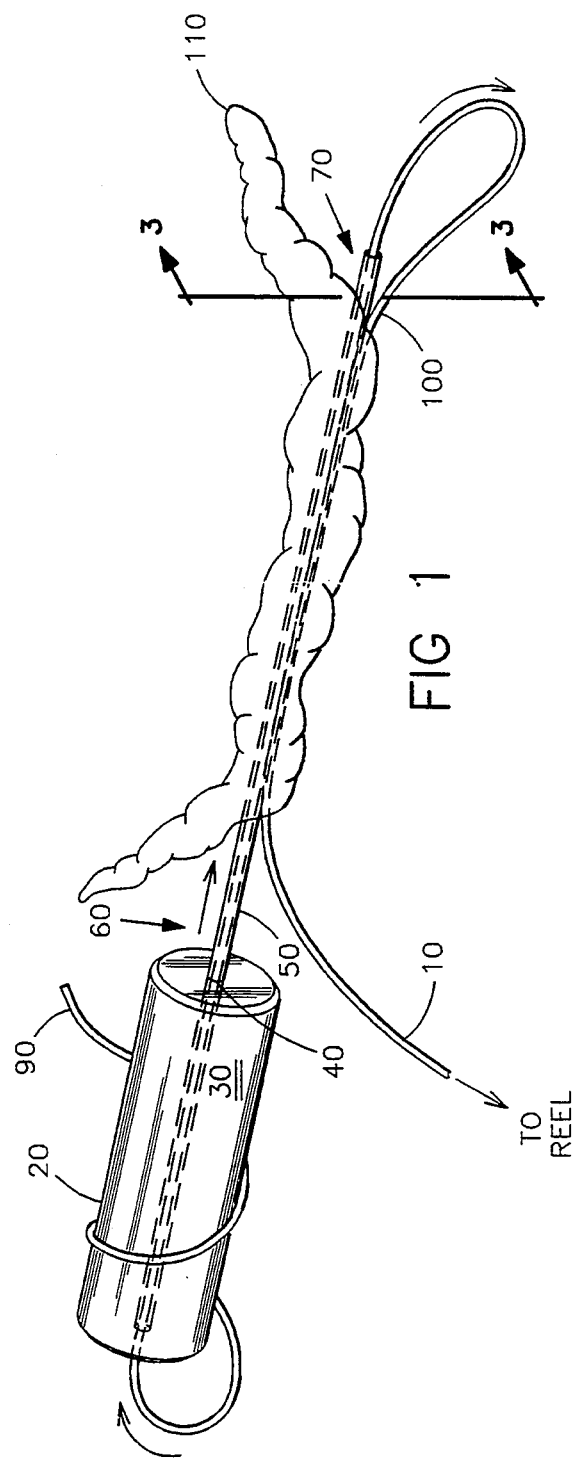
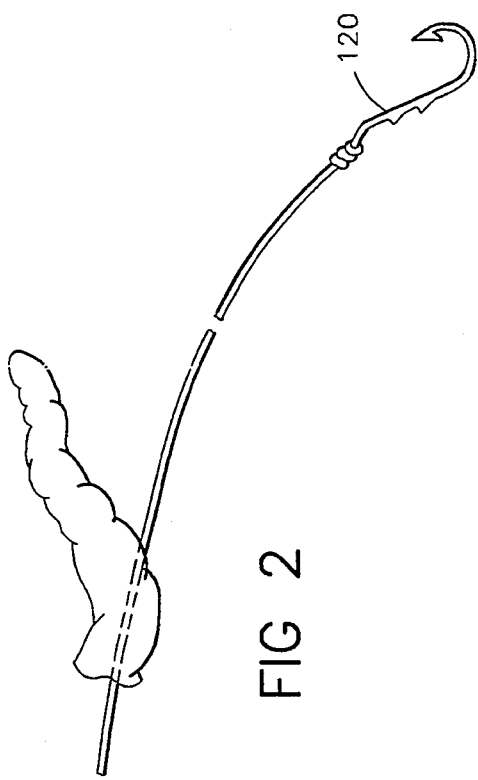

APPARATUS FOR BAITING A FISHING LINE

FIELD OF THE INVENTION

This invention relates generally to fishing devices, and, more particularly, is directed towards a device for assisting in the baiting of a fishing line, and a method of its use.

BACKGROUND OF THE INVENTION

A variety of fishing bait threaders exist that include a hollow, sharpened needle attached in some fashion to a handle. The end of the needle typically includes a groove or other means to accept the sharp end of a fishing hook that is attached to a fishing line. In use, a worm or other fishing bait is pierced with the needle and slid down the needle towards the handle. The fishing hook is then engaged with the end of the needle, and the bait is slid back off of the needle and onto the hook and fishing line and positioned as desired for use. Examples of such prior art devices are found in the following patents:

| Pat. No.  | Inventor          | Issue Date     |
| --------- | ----------------- | -------------- |
| 4,073,083 | Davis             | Feb. 14, 1978  |
| 4,706,403 | Reynolds          | Nov. 17, 1987  |
| 4,915,631 | Robinson et al.   | Apr. 10, 1990  |
| 4,674,220 | Bearce, Jr. et al.| Jun. 23, 1987  |
| 5,125,180 | Dean              | Jun. 30, 1992  |
| 5,155,930 | Monarez           | Oct. 20, 1992  |

One drawback to such devices is that they are difficult to use in that one must maintain a tension on the fishing line to keep the hook engaged with the end of the needle while, at the same time, slide the bait off of the needle and onto the hook and line. Indeed, several of these prior art patents are founded upon an improved tension maintaining means that firmly holds the fishing line taunt while baiting the hook. However, such devices are still awkward to use and relatively complicated and costly.

A further drawback of such devices is that the hollow needles of such devices tend to collect dead organic matter as they are forced through the bait. Even after one use such devices pose a serious health threat if the sharp end of the device inadvertently cuts or scrapes a person's skin. Clearly, to some extent, any type of bait piercing device will become unsanitary. However, prior art devices are nearly impossible to clean since only one end of the needles of such devices is open. Over time, dead matter collects at the other, closed end with no easy means by which to remove it.

A further drawback with many such prior art devices is that the end of the needles are bent, making it very difficult to track such a needle through the bait in a straight path. Further, upon sliding the bait onto the hook, the bait is forced for a time to bend along the same arc as the hook. Some baits are not so flexible as to allow such bending without tearing of the bait, especially with a relatively small hook. Moreover, using such devices requires one to choose a hook before choosing a bait, since the hook must be fastened to the line before the line is baited. If a particular hook happens to be already fastened to a line, a suitable bait must be selected for that particular hook. In many situations, however, it is more advantageous to choose the bait first, depending upon the fishing conditions, and only then select the appropriate hook.

Clearly, then, there is a need for an effective bait threading tool that is easy to clean and therefore safer to use. Such a needed device would, to some extent, even be self-cleaning. Further, such a needed device would be extremely simple and inexpensive to manufacture, and would allow the line to be baited before selecting a hook. Such a needed device would track through the bait in a straight line, and therefore would be easier to use. The present invention fulfills these needs and provides further related advantages.

SUMMARY OF THE INVENTION

The present invention is an apparatus and method for baiting a fishing line. A handle has a hole therethrough and a surface for gripping the handle. An elongate tube has a proximal end and a distal end and is fixedly engaged with the hole of the handle at the proximal end. The distal end of the tube has a terminal edge which may include a sharp edge for cutting through a bait. In use, a free end of the fishing line is threaded first through the tube, from the distal end to the proximal end, and then through the handle. The free end of the fishing line is then secured to the handle. A looped portion of the fishing line is then extended from the distal end of the tube and along the tube. The tube is then forced through the bait such that the distal end of the tube extends clear of the bait. The free end of the fishing line is then drawn out of both the tube and the handle. The tube is then withdrawn from the bait, leaving the fishing line within the bait with the free end of the fishing line available for affixing a fishing device to the free end.

The present invention is an effective bait threading tool that is easy to clean and therefore safer to use than prior art devices. In fact, as the fishing line is forced through the hollow tube, the present device is even somewhat self-cleaning. Further, the present invention is extremely simple and inexpensive to manufacture, and allows the fishing line to be baited before selecting and fastening a hook. The present device tracks through the bait in a straight line, and therefore is easier to use than many of the prior art devices. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective illustration of the invention, illustrating a fishing line configuration with a bait slid over a tube of the invention;

FIG. 2 is a partial perspective illustration of the invention, illustrating a fishing hook fastened to a free end of the fishing line of FIG. 1.

DETAILED DESCRIPTION OF THE PREFERRED EMBODIMENT

Figure 4:
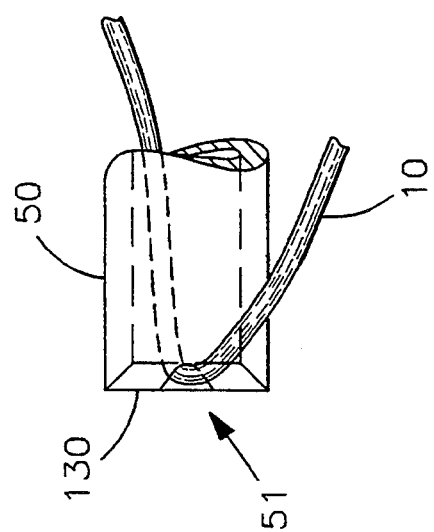
FIG. 4 is a partial view of the tube means of the invention showing the type and location of a notch in the edge of the invention.

FIG. 1 illustrates an apparatus for baiting a fishing line 10. A handle means 20 has a hole 40 therethrough and a surface 30 for gripping the handle means 20. An elongate tube means 50 has a proximal end 60 and a distal end 70 and is fixedly engaged with the hole 40 of the handle means 20 at the proximal end 60. The handle means 20 may be manufactured from any suitably rigid material, such as plastic or wood. Such a material, however, clearly must be chemically resistant to sea water and the like. The tube means 50 is preferably a hollow tube of stainless steel, or the like.

Figure 3:
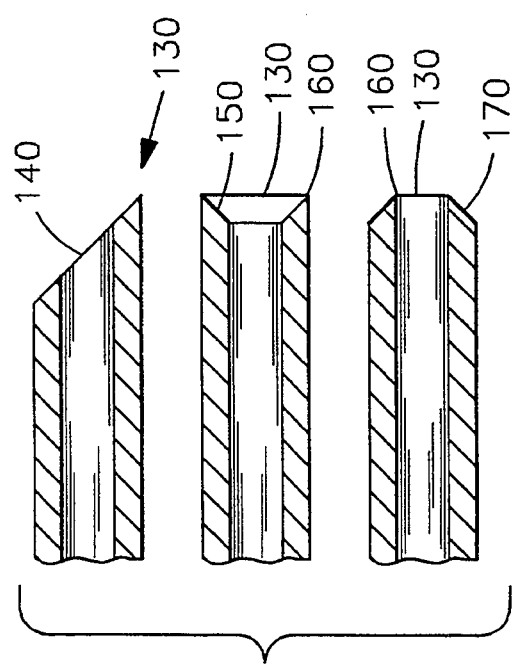
FIG. 3 is a partial cross-sectional view of three alternate terminal edges of the tube of the invention.

As illustrated in FIG. 3, the distal end 70 of the tube means 50 has a terminal edge 80. The terminal edge 80 may include a sharp edge 130 for cutting through a bait 110. Such a terminal edge 80 may include an oblique end surface 140 that forms the sharp edge 130 between the surface 140 and the portions of the outside diameter and also the inside diameter of the tube means 50. Alternatively, the terminal edge 80 of the tube means 50 may include an inwardly convergent angled annular surface 150, such a surface 150 forming the sharp edge 130 as a circular corner 160 between the surface 150 and the outside diameter of the tube means 50. Alternatively, the terminal edge 80 of the tube means 50 may include an outwardly divergent angled annular surface 170. Such a surface 170 forms the sharp edge 130 as a circular corner 160 between the surface 170 and the inside diameter of the tube means 50. Further, notch 51, shown in FIG. 4, is included in the sharp edge 130 to accept the fishing line 10 so as to not damage the fishing line 10 when the tube means 50 is forced through the bait 110.

In use, a free end 90 of the fishing line 10 is threaded first through the tube means 50, from the distal end 70 to the proximal end 60, and then through the handle means 20. The free end 90 of the fishing line 10 is then secured to the handle means 20. A looped portion 100 of the fishing line 10 is then extended from the distal end 70 of the tube means 50 and along the tube means 50. The tube means 50 is then forced through the bait 110 such that the distal end 70 of the tube means 50 extends clear of the bait 110. The free end 90 of the fishing line 10 is then drawn out of both the tube means 50 and the handle means 20. The tube means 50 is then withdrawn from the bait 110, leaving the fishing line 10 within the bait 110 with the free end 90 of the fishing line 10 available for affixing a fishing device 120 to the free end 90.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. Apparatus for baiting a fishing line comprising:
   handle means having a surface for gripping the handle means and a hole therethrough; and
   elongated tube means with a proximal end and a distal end, the proximal end being engaged by the hole in the handle means such that the handle means and the tube means are fixed together in operant mutual support, the distal end having a sharp terminal edge, the terminal edge providing a notch therein, the notch being adapted for accepting the fishing line;
   such that a free end of the fishing line may be threaded through the tube means and the handle means, a looped portion of the fishing line extending from the distal end of the tube means, within the notch, and therefrom, alongside the tube, so that the tube may be forced through a bait, without the terminal edge cutting the fishing line, until the distal end of the tube is extended clear of the bait, allowing the free end of the fishing line to be drawn out of both the tube means and the handle means, the tube then being withdrawn from the bait, leaving the fishing line within the bait with the free end of the fishing line available for affixing a fishing device thereto.

2. The apparatus for baiting a fishing line of claim 1 wherein the terminal edge of the tube means includes an oblique end surface, the surface forming the sharp edge between the surface and portions of the outside diameter and also the inside diameter of the tube means.

3. The apparatus for baiting a fishing line of claim 1 wherein the terminal edge of the tube means includes an inwardly convergent angled annular surface, the surface forming the sharp edge as a circular corner between the surface and the outside diameter of the tube means.

4. The apparatus for baiting a fishing line of claim 1 wherein the terminal edge of the tube means includes an outwardly divergent angled annular surface, the surface forming the sharp edge as a circular corner between the surface and the inside diameter of the tube means.

5. A method for baiting a fishing line with an elongated tube means having a proximal end and a distal end, the proximal end being engaged by a hole in a handle means, the distal end having a sharp edge, including the steps of:
   a) threading a free end of the fishing line through the tube means from the distal end to the proximal end;
   b) securing the free end of the fishing line at the handle means;
   c) forming a looped portion of the fishing line to extend from the distal end, external to the tube means, to the handle means;
   d) forcing the tube means through a bait such that the distal end of the tube is extended clear of the bait;
   e) drawing the free end of the fishing line out of both the tube means and the handle means so that the looping portion of the fishing line remains within the bait;
   f) withdrawn the tube means from the bait, leaving the fishing line within the bait with the free end of the fishing line available for affixing a fishing device thereto.

* * * * *